INVENTORS
ROBERT D. DUNSTON
GERALD E. WHITEHURST
JACOB S. SALETZKI

United States Patent Office 3,429,623
Patented Feb. 25, 1969

3,429,623
CRANKSHAFT THRUST PLATE
Robert D. Dunston, Washington, Gerald E. Whitehurst, East Peoria, and Jacob S. Saletzki, Peoria, Ill., assignors to Caterpillar Tractor Co., Peoria, Ill., a corporation of California
Filed May 2, 1967, Ser. No. 635,568
U.S. Cl. 308—23                    5 Claims
Int. Cl. F16c 9/00, 13/00, 3/06

---

ABSTRACT OF THE DISCLOSURE

Apparatus for countering axial thrust of an engine crankshaft and for controlling connecting rod edge loading. Means disposed upon a central journal of the crankshaft to act against a main bearing housing and connecting pin guide means replaceably disposed upon additional journals of the crankshaft to act against the connecting rods.

---

*Background of the invention*

A crankshaft operating in the cylinder block of an engine is typically subject to axial thrust from various factors such as engine motion or operation, vibration, etc. It is desirable to control this axial thrust while permitting a certain amount of end play in the crankshaft for proper operation of the engine. A typical solution in the prior art is a thrust plate attached to a journal at each end of the crankshaft. The thrust plates act against the engine or cylinder block to establish selected limits of crankshaft end play with respect to the cylinder block.

However, thrust plates disposed at the ends of the crankshaft often do not provide optimum limits of control over axial thrust or end play, for example, when the crankshaft and cylinder block are subject to wide temperature variations. This problem is particularly severe when the crankshaft and cylinder block are of different materials of construction having different co-efficients of expansion, for example a steel crankshaft in an aluminum block. In such an arrangement, end play permitted by the thrust plates when the engine is cold must be sufficient to compensate for the expansion difference between the block and the entire length of the crankshaft during engine operation. Thus, the engine designer is forced to make a selection between excessive original end play or, e.g., possible binding of the crankshaft at high temperatures. Either choiice may be very undesirable, particularly in high output engines where high loadings and excessive stresses are present.

An additional problem arises in edge loading of connecting rod bearings when the connecting rods are guided at the piston pin end while being free to move axially on the crank pin. When differential expansion of the block and crankshaft occur as noted above, the piston end locations of the connecting rods tend to vary axially with respect to the crankshaft. Since the connecting rods are guided at the piston end, they tend to cock and be edge loaded with respect to the crank pin bearing surface on which they ride, that is, they move against the machined radius between the crank pins and adjacent journals of the crankshaft. When subjected to high loading, such as in the high output engine noted above, life of the connecting rod bearing surfaces and the crankshaft itself may be substantially reduced with a resulting necessity of frequently replacing at least the bearing surfaces of the connecting rods as well as the entire crankshaft.

*Summary of the invention*

The present invention provides a structurally simple and surprisingly effective means for overcoming these problems. Thrust countering means are disposed upon the central journal of a crankshaft to act against a cylinder block in which the crankshaft is rotatably disposable to substantially counter the axial thrust of the crankshaft.

*Description of the preferred embodiment*

Figure 1:
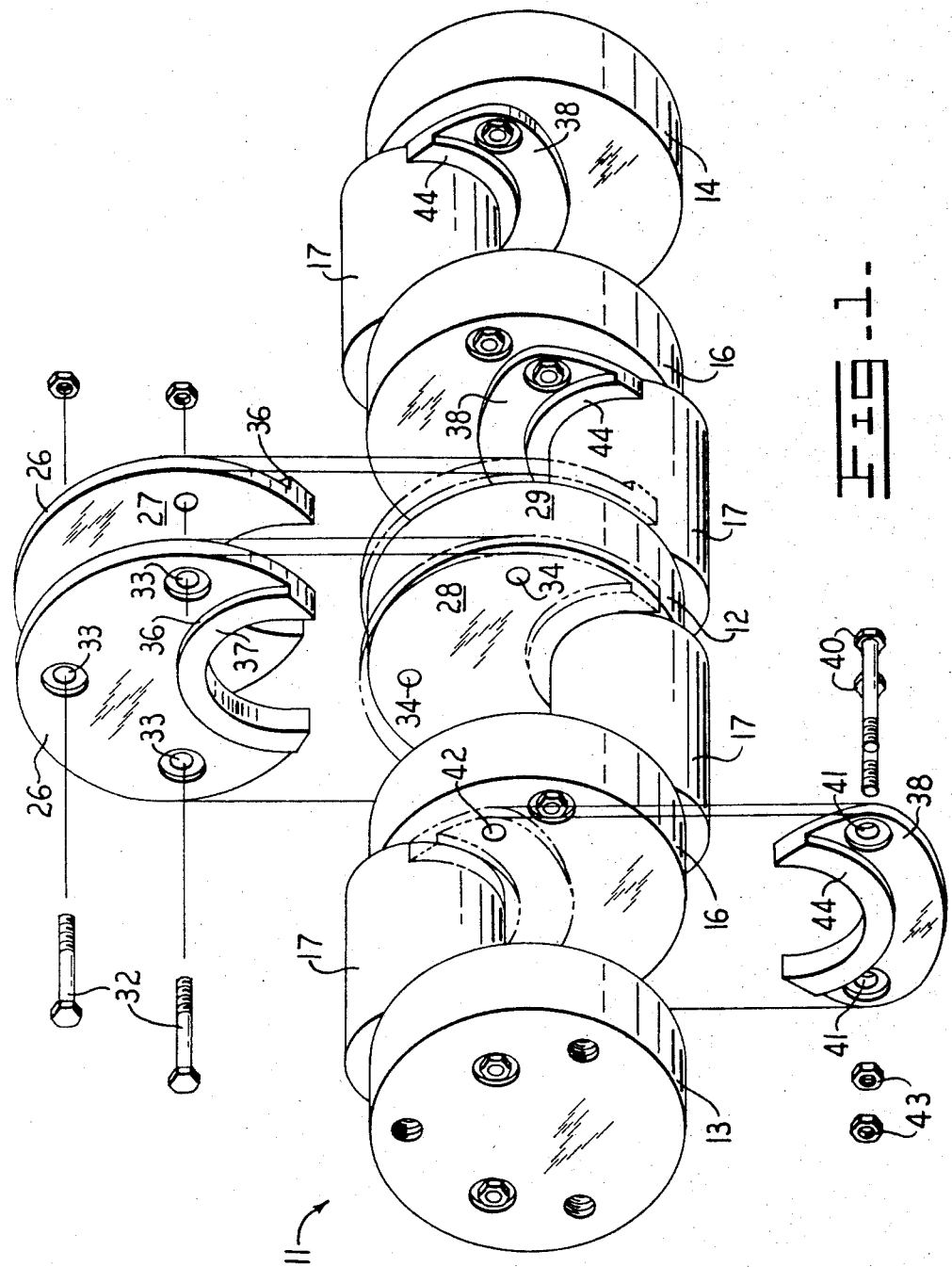
FIG. 1 is a partially exploded isometric view of a crankshaft including replaceable thrust plates and replaceable connecting rod pin guide plates.
Figure 2:
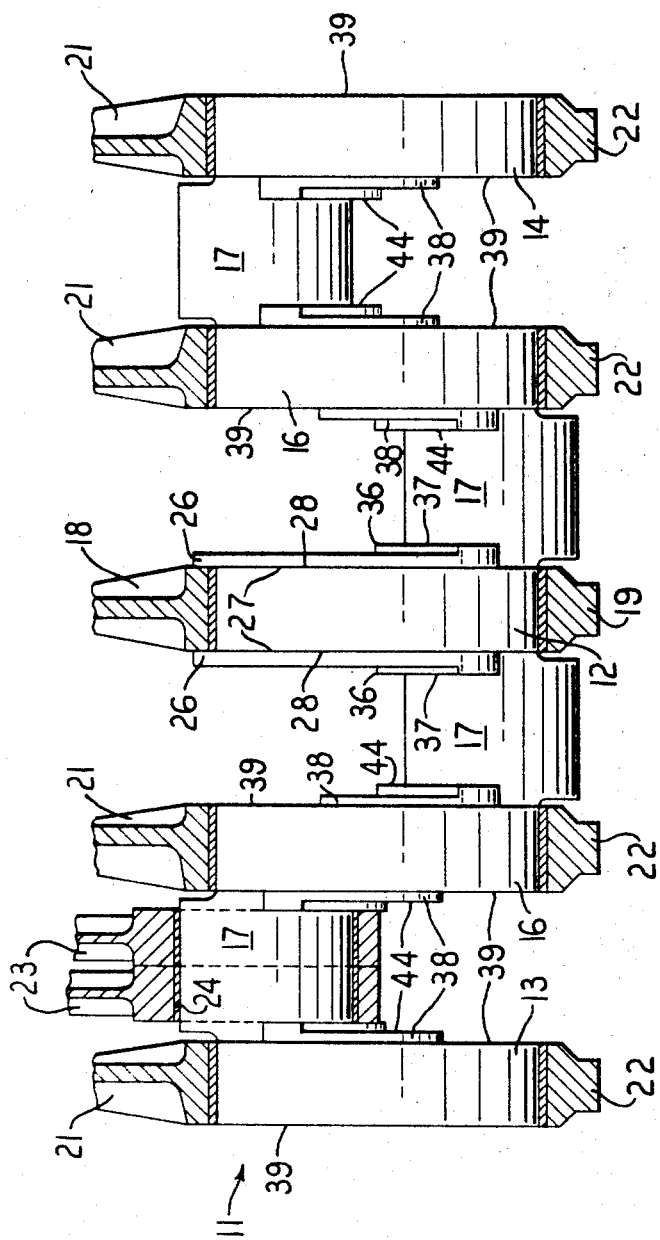
FIG. 2 is a sectioned radial view of the crankshaft disposed in cylinder block bearing housings and including connecting rod pins.

With reference to FIGS. 1 and 2, a typical semi-barrel crankshaft 11 comprises a central journal 12, a pair of end journals 13 and 14 and intermediate journals 16. The journals 12–16 are axially connected in usual offset fashion by crankshaft pins 17.

For operation of the crankshaft in an engine (not shown), having particular reference to FIG. 2, the central crankshaft journal 12 is rotatably disposed in a central main bearing box 18 and therein secured by a main bearing cap 19. The other journals 13, 14 and 16 are similarly disposed in main bearing boxes 21 and secured by bearing caps 22. Connecting rods 23 (shown in position only on the left hand crank pin) are placed in pairs with their inside bearing surfaces 24 about each of the crankshaft pins 17.

To counter axial thrust of the crankshaft, having particular reference to FIG. 1, thrust countering means 26 are disposed upon the central journal 12 to act against a fixed component of the engine or cylinder block. The thrust countering means, as shown, are preferably two crescent-shaped thrust plates disposed upon either side of the central journal 12. Each thrust plate 26 has an inside planar surface 27 adjacent an axially normal surface 28 of the central journal. Inside surfaces 27 of the thrust plates extend radially beyond the peripheral surface 29 of the central journal to slidably act against fixed surfaces 31 of the central main bearing housing 18. The thrust plates 26 are replaceably affixed to the central journal by any suitable means, for instance by bolts 32 inserted through counterbored holes 33 in the thrust plates 26 and holes 34 in the central journal 12.

To illustrate the effectiveness of the present thrust countering means 26, when the crankshaft was made of steel, with thrust plate means on its end journals, and was disposed in an aluminum cylinder block, their different co-efficients of expansion, as discussed above, required machine tolerances permitting initial end play of .060 to .090 inch, i.e., in a pre-warm-up or cold engine condition. Such a large machine tolerance was necessary because, with thrust plates disposed on the end journals, differential expansion of the entire length of the crankshaft had to be taken into account.

By contrast, the advantage of the present invention is readily apparent. By disposing the thrust plates 26 on either side of the central journal 12, only the differential thermal expansion of the axial thickness of the central journal need be taken into account. Minimum machining tolerances and initial end play, in a prewarm-up or cold conditions, are accordingly, reduced by better than one-half of the above-noted figures.

To reduce edge loading of the connecting pins 23, the thrust plates 26 preferably have a generally annular cheek 36 adjacent one of the crankshaft pins 17 and distal its associated journal 12. The annular cheek bearing surfaces 37 thus axially act against adjacently disposed connecting pins 23, for a purpose similar to that discussed below with respect to connecting pin guide plates 38.

To provide similar bearing surfaces at the other journals 13, 14 and 16 and control connecting pin edge loading, a crescent-shaped connecting pin guide plate 38 is placed on each axially normal surface 39 of those journals which are adjacent a crankshaft pin 17.

The guide plates 38 are replaceably disposed upon the journals 13, 14 and 16 by bolts 40 passing through connecting rod guide plate holes 41 and journal holes 42 which are coutnerbored as necessary to countersink the bolts 40 and nuts 43. Each connecting rod guide plate 38 has a generally annular cheek surface 44 adjacent one of the crankshaft pins 17 and distal the journal 13, 14 or 16 on which the guide plate is disposed. The machine tolerances between the guide plate cheek surfaces 44 or between guide plate surfaces and thrust plate surfaces are selected to provide the proper axial action against connecting rods 23. For example, as the engine heats up during operation, the aluminum block expands axially at a greater rate than the steel crankshaft and the piston ends of the connecting pins being fixed with respect to the block, vary in their linear alignment with the crank pins to which they are connected. This variation in alignment results in the cocking of the connecting pins referred to above. The cheek surfaces of the guide plates and thrust plates prevent the bearing surfaces of the connecting rods, which mate with the crank pins, from also being axially cocked and exerting edge loading on the crankshaft. Rather, the loading on the rods, due to cocking, is received along the full cheek surface of the guide plates and thrust plates so that the resulting rate of wear is reduced. Further, when such wear exceeds permissible or desired limits, the guide plates and thrust plates may be replaced without a necessity to replace the relatively expensive crankshaft.

Thus, the present invention provides a crankshaft in which the axial machining tolerances or permissible initial end play are substantially reduced as is particularly desirable in high output or increased horsepower engines. Additionally, edge loading interaction of the connecting rods with the crankshaft pins, due to connecting rod motion control at the piston end, is substantially reduced. Further, the bolted arrangement of thrust plates 26 and connecting rod guide plates 38 on the journals permits ready and economical interchanging or replacement of these components when bearing surface wear places machining tolerances outside of permissible limits.

Although the invention has been particularly described with reference to a crankshaft disposed in the cylinder block of an engine, it is to be noted that the features of the invention may be embodied in a crankshaft by itself which is disposable within such an engine block.

What is claimed is:

1. A crankshaft for use in an engine cylinder block comprising a central crankshaft journal disposable for rotation in a central bearing housing of the cylinder block and at least one additional journal at each end of the crankshaft being disposable for rotation in respective bearing housings, a thrust plate being replaceably disposed on each side of the central journal and extending radially outwardly of the central journal to act against the central bearing housing, the additional end journals being generally free for axial movement relative to their respective bearing housings so that axial thrust of the crankshaft in the cylinder block is substantially countered solely by the thrust plates on the central journal.

2. The invention of claim 1 wherein the crankshaft and cylinder block are constructed of different materials having different coefficients of thermal expansion.

3. In a crankshaft according to claim 1 wherein the crankshaft journals are axially joined by crankshaft pins having cylindrical bearing surfaces, connecting rods being rotatably disposable about the crankshaft pin bearing surfaces between the axially normal journal surfaces, and wherein the connecting rods are subject to edge loading caused by axial motion along the pin bearing surfaces, the combination further defined by:

said thrust plates having generally annular cheek surfaces adjacent the connecting pin bearing surfaces and distal the central journal; and connecting rod guide plates replaceably disposed on the additional crankshaft journals, each such rod guide plate having a generally annular cheek surface adjacent the pin bearing surfaces and distal the crankshaft journal on which each guide plate is disposed, said thrust plate cheek surfaces and said connecting rod guide plate cheek surfaces axially and slidably acting against the connecting rods to limit axial movement therof.

4. A crankshaft having cylindrical crankshaft journals with axially normal surfaces axially joined by crankshaft pins having cylindrical bearing surfaces and connecting rods being rotatably disposable about the crankshaft pin bearing surface, wherein:

connecting rod guide plates are replaceably disposed on the axially normal crankshaft journal surfaces, said connecting rod guide plates each having a generally annular cheek surface adjacent the pin bearing surfaces and distal the crankshaft journal on which each guide plate is disposed, said connecting rod guide plates cheek surfaces axially and slidably acting against the connecting rods to limit axial movement thereof.

5. A crankshaft rotatably disposed in a central main bearing housing defining an inside cylindrical bearing surface and having first and second fixed surfaces normal thereto and at least two end cylinder block bearing housings defining similar inside cylindrical bearing surfaces axially aligned on either side of the central cylinder main block bearing surface, the crankshaft further rotatably disposed with relation to connecting rods by inside cylindrical connecting rod bearing surfaces, the crankshaft having:

a central cylindrical crankshaft journal with first and second axially normal surfaces and a peripheral bearing surface rotatably disposed in the cylindrical central housing bearing surface;

at least two end crankshaft journals with axially normal surfaces, each journal respectively disposed for rotation in one of the end bearing housings;

at least two crankshaft pins axially disposed between said central and end crankshaft journals, each pin having a cylindrical bearing surface disposed for rotation within the bearing surface of at least one of the connecting rods;

first and second crescent-shaped thrust plates replaceably disposed respectively on said first and second axially normal central journal surfaces, said thrust plates having a bearing surface adjacent the respective axially normal journal surface and extending radially beyond said central journal peripheral surface to slidably act against the first and second axially normal main bearing housing surfaces respectively, said thrust plates each having a generally annular cheek surface normally adjacent the cylindrical pin surfaces to slidably act against a connecting rod; and a plurality of crescent-shaped connecting rod guide plates each replaceably bolted to one of said axially normal end journal surfaces adjacent one of said crankshaft pins, said guide plates each having a generally annular bearing surface normally adjacent one of said cylindrical pin surfaces to slidably act against at least one of the connecting rods and limit axial movement thereof.

References Cited

UNITED STATES PATENTS

| | | | |
|---|---|---|---|
| 1,358,706 | 10/1920 | Snyder | 308—23 |
| 1,359,438 | 11/1920 | Sharpnack | 308—165 |
| 1,362,584 | 12/1920 | Gammon | 308—167 X |
| 1,492,684 | 5/1924 | Goode | 308—167 |
| 1,646,416 | 10/1927 | Monckmeier | 308—167 |

FOREIGN PATENTS 1,012,142  12/1965  Great Britain.

CARROLL B. DORITY, Jr., *Primary Examiner.*

U.S. Cl. X.R.

308—167; 74—579